United States Patent [19]

Moczala

[11] Patent Number: 4,581,553
[45] Date of Patent: Apr. 8, 1986

[54] BRUSHLESS DC MOTOR, ESPECIALLY LINEAR MOTOR, HAVING AN INCREASED FORCE-TO-VELOCITY RATIO

[76] Inventor: Helmut Moczala, Peter-Wiese-Str. 7, 5778 Meschede, Fed. Rep. of Germany

[21] Appl. No.: 600,520

[22] Filed: Apr. 16, 1984

[51] Int. Cl.⁴ ............................................. H02K 41/00
[52] U.S. Cl. ........................................ 310/12; 318/135
[58] Field of Search .................................. 310/12–19; 318/135

[56] References Cited

U.S. PATENT DOCUMENTS 4,370,577   1/1983   Wakabayashi ........................ 310/12

OTHER PUBLICATIONS

*IBM Tech. Disc. Bulletin,* "Linear Incremental Motor," Thompson, vol. 6, No. 9, 2/64, pp. 19–20.
The article "Ueber den Einsatz von Linearmotoren als Positionierantriebe" by Dieter Brämer, appearing on pp. 163–167 of the periodical Feinwerktechnik & Messtechnik, 89 (1981) 4.

*Primary Examiner*—Donovan F. Duggan
*Attorney, Agent, or Firm*—Theodore J. Koss, Jr.

[57] ABSTRACT

A brushless DC motor, most especially a linear motor, has a wound and an unwound part, one part forming the stator and the other the armature, and includes a permanent field magnet arrangement to generate flux and windings linked by the flux. One motor part is provided with a series of flux-conducting portions and the other part is provided with a plurality of flux-carrying portions forming an air gap with the flux-conducting portions. By making the distance from one flux-conducting portion to the next small, and the distance from one flux-carrying portion to the next small, it becomes possible to minimize the distance through which the armature need move to go from a position linking maximum first-polarity flux with a respective winding to a position linking maximum second-polarity flux with that winding. By then providing the flux-carrying portions in an appropriately increased number, to thereby increase the values of the maximum first- and second-polarity linked flux, the force-to-velocity ratio of the motor can be almost arbitrarily increased, this being the equivalent of providing in a rotary motor speed-reducing gearing of high mechanical advantage.

8 Claims, 7 Drawing Figures

BRUSHLESS DC MOTOR, ESPECIALLY LINEAR MOTOR, HAVING AN INCREASED FORCE-TO-VELOCITY RATIO

BACKGROUND OF THE INVENTION

The present invention concerns brushless DC motors, and especially brushless DC linear motors of the type comprising at least one permanent magnet system and wound stack of iron laminations, the current flow in the constituent windings being reversed or switched on and off by controllable semiconductor elements operating in dependence upon sensed armature position. Linear motors of such type are often employed in relatively high-precision devices, e.g. in typewriters for the horizontal displacement of the printing head relative to a sheet of paper to be imprinted.

When such linear motors are use in positioning systems, the component to be displaced by such system, e.g. the printing head of a typewriter, should reach the desired position as quickly as possible. To this end the linear motor must exert the highest force realizable in order to effect displacement of such component with high acceleration.

At present, positioning systems which implement linear motions are predominantly equipped with rotary motors connected to the linearly displaced component through the intermediary of speed-reducing gearing and a drive belt. Also, linear motors operating according to the principle of step motors or brushless DC motors find use and are the subjects of ongoing investigation (see, e.g., the West German periodical "Feinwerktechnik & Messtechnik" 89 (1981), Vol. 4, pp. 163–167).

The use of rotary motors has the advantage that, due to the provision of the intermediate speed-reducing gearing, high displacement force can be exerted even with motors of relatively low power. Countervailing disadvantages, however, include the considerable cost of the requisite gearing and drive belts and, also, the often undesirable effects of the latter elements upon the dynamic behavior of the resulting positioning system.

As for linear motors, those types operating in the manner of step motors are far from ideal for positioning systems, due to their effect upon the dynamic behavior of the system: these types of motors tend towards armature oscillation and behave not very muscularly when accelerating the component to be displaced.

In contrast, DC linear motors exhibit comparatively appropriate behavior. However, conventional designs for such motors generally require a higher volume of motor material than a comparable rotary motor; i.e., due to the lack of intermediate speed-reducing gearing, these motors must be designed to exert, quite directly, the full magnitude of the intended displacement-effecting force.

SUMMARY OF THE INVENTION

Accordingly, it is a main object of the invention to provide a linear motor which, without the need for an increased volume of material, can nevertheless exert high forces.

As explained more fully in the detailed description, the above object can be attained with the present invention by configuring the magnetic circuit of the motor to include a series of flux-carrying portions on one part of the motor (i.e., the stator or the armature) and a plurality of flux-conducting portions on the other motor part (i.e., the armature or the stator), the flux-carrying portions forming an air gap with the flux-conducting portions. For example, the flux-carrying portions may be formed by a series of permanent-magnet sections each of which is polarized in a direction normal to that of armature travel, successive portions being of different polarity, the aforementioned flux-conducting portions being provided on the wound motor part whose winding is so located that the flux conducted by the flux-conducting portions passes through the winding.

If the length of the magnet sections, measured along the direction of armature travel, is made as small as practicable, the result will be that the distance through which the armature must travel to link with the winding a first-polarity flux maximum and then a second-polarity flux maximum, is likewise made as small as practicable. Due to such minimizing of the pole pitch of the series of permanent-magnet sections, the aforementioned flux-conducting portions can be provided more closely spaced one to the next and thus, for a given space availability, more numerous. The greater the number of such flux-conducting portions, the higher become the values of the first- and second-polarity flux maxima. Thus, for a given type of geometry for the linear motor, by decreasing the pole pitch and correspondingly increasing the number of flux-conducting portions as much as possible, the force exerted by the motor can be correspondingly increased. This force multiplication is achieved at the expense of armature velocity; i.e., for a given input power, the more the concept of the invention is utilized, the higher will become the exerted force and the lower will become the armature velocity. Thus, it becomes possible with such a linear motor design to achieve, without the use of intermediate speed-reducing gearing, whatever force-to-velocity ratio may be desired for a particular application.

It is a noteworthy advantage of this concept that the resulting drive system can be less expensive than one incorporating a rotary motor, on account of the elimination of speed-reducing gearing and drive belts; and nevertheless require a total amount of motor material scarcely greater than that required for the equivalent rotary motor. Likewise, the elimination of such gearing and belts results in an inherently simpler and more reliable design, which will furthermore often exhibit improved dynamic behavior.

The novel features which are considered characteristic for the invention are set forth in particular in the appended claims. The invention itself, however, both as to its construction and method of operation, together with additional objects and advantages thereof, will be best understood from the following description of specific embodiments when read in connection with the accompanying drawing.

DESCRIPTION OF THE PREFERRED EMBODIMENTS

Figure 1:
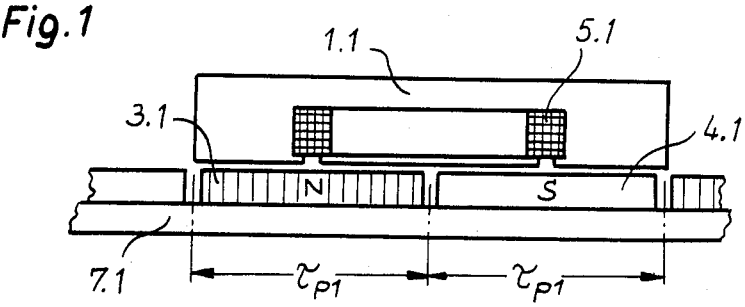
FIG. 1 depicts in schematic manner a first hypothetical motor referred to in explaining the principles of the present invention.

FIG. 1 depicts, reduced to its essentials, a DC linear motor; it can be imagined that such motor is generated by snipping radially through a corresponding rotary DC motor and spreading the same out flat. The motor of FIG. 1 comprises a wound motor part including a stack 1.1 of laminated iron equipped with a winding 5.1; and furthermore an unwound motor part having permanent magnets 3.1 and 4.1 and a flux-return or yoke member 7.1. The manner of commutation and the particular motor type can be of various known kinds. For example, the winding 5.1 can be comprised of a single coil, and a position sensor for the motor's armature (whether its wound or its unwound part) can be used to control one or more transistors and thereby reverse the direction of current through the coil as the armature reaches positions requiring such direction reversal to effect continued armature travel. Equivalently, the winding 5.1 can be bifilar and comprise two identically wound coils; in that event, during 180°-el. of armature travel, one coil is conductive and the other not and then, during the subsequent 180°-el. of armature travel, the first coil becomes non-conductive and the second conductive; this makes it unnecessary actually to reverse the direction of current flow in a single coil.

At the time when the direction of current through winding 5.1 is being commutated, no electromagnetic force is exerted by the motor. Accordingly, in conventional manner, a second (non-illustrated) winding system 1.1, 5.1 can be provided, displaced by the equivalent of 90°-el. relative to the illustrated system 1.1, 5.1; this second system would be commutated in identical manner, but its commutation positions would be offset by 90°-el. from those of the shown system 1.1, 5.1; in this way, when one of the two winding systems is contributing no electromagnetic force, the other one will, so that the net electromagnetic force never be zero. Likewise, three such winding systems could be provided, displaced one from the next by the equivalent of 120°-el.; and so forth, for other such cases. The armature position sensor which commands the successive commutations can be of conventional type, comprised e.g. of Hall elements, magnetic field plates, an optical sensor sensing position markings on the armature, etc.

Figure 2:
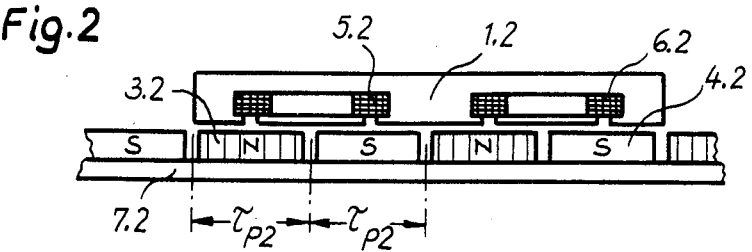
FIG. 2 depicts a further such hypothetical motor set forth as a modification of that of FIG. 1.
Figure 3:
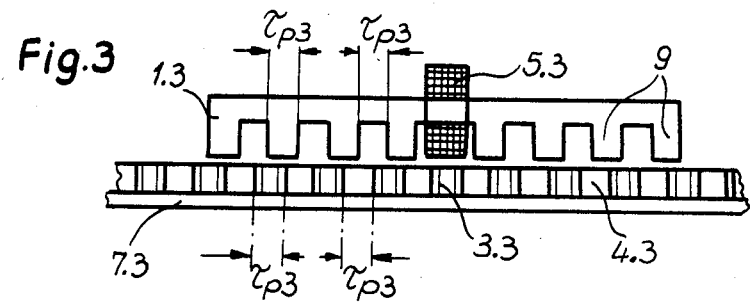
FIG. 3 depicts in schematic and rudimentary form a motor embodying concepts of the present invention.

FIGS. 2 and 3 depict further DC linear motors compared below to that of FIG. 1. In all three motors the amount of permanent-magnet material employed is the same, as is also the effective cross-sectional area of the winding. Likewise the same in all three motors are the amounts of conductor material used for the winding, i.e., considering only the total length of conductor actually contributing to generation of electrodynamic force; of course, in FIGS. 2 and 3, the total length of conductor not contributing to electrodynamic force is less than in the case of FIG. 1. Also, in FIGS. 2 and 3 the thickness of the flux-return or yoke member 7.2 or 7.3 is half that in FIG. 1, this constituting a certain advantage relative to the FIG. 1 geometry, although not the main advantage here of interest.

Of main interest here is a comparison as to the magnitude of electromagnetic force produced by the three different motors, and this will now be explained. The force developed as between the stator and armature of a motor may be formulated as follows:

$$F = \sum_n N_n i_n \frac{d\Phi_n}{ds}$$

(see the West German periodical "Feinwerktechnik & Messtechnik" 88 (1980), Vol. 4, pp. 177–182).

It will here be assumed that the permissible heat generation in the case of each motor is such that the maximum permissible winding current densities are the same in all three motors. Assuming furthermore that identical constituent wire, i.e. always of the same cross section, is used in the windings of all three motors, then the maximum permissible current (which one must know to compute the developed motor force) will be the same for all three motors, namely: $i_n = I_{max}$.

Figure 5:
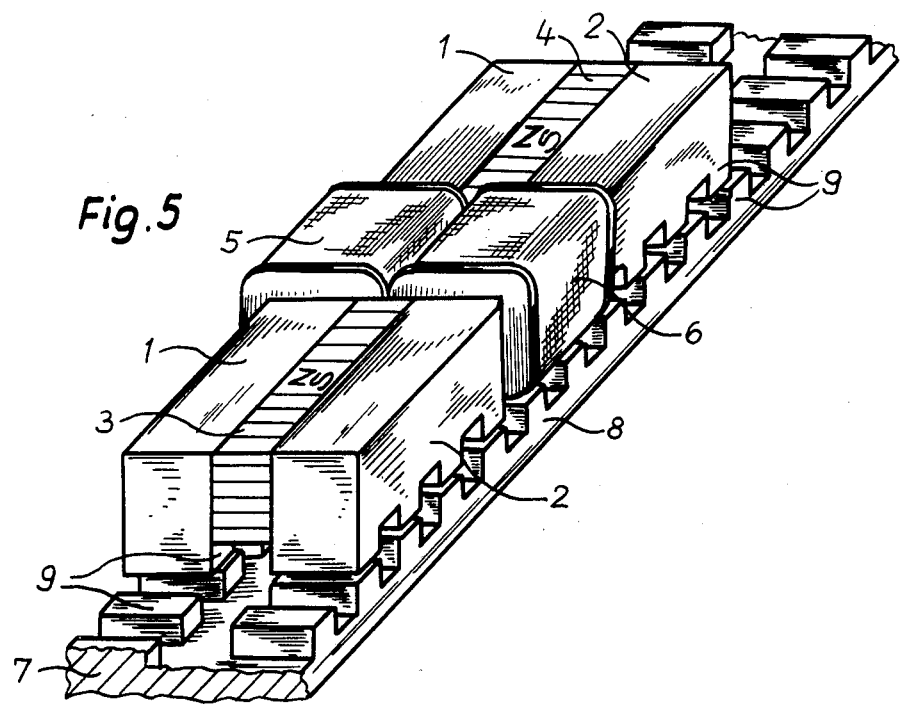
FIG. 5 depicts a further preferred form of the inventive motor.

In order that for all three motors the respective winding systems have the same total effective cross-sectional area, the two constituent windings 5.2 and 6.2 in FIG. 2 each have N/2 turns, the comparable windings 5.1 in FIG. 1 and 5.3 in FIG. 3 each having N turns.

In the above force equation, the differential quotient $d\Phi_n/ds$ represents the change in permanent-magnet flux linking the respective winding system per unit distance s of armature travel when the armature travels the distance ds. If one assumes that the magnitude of permanent-magnet flux is identical at all points along the air gap defined between the permanent-magnet row and the iron lamination stack 1.1 of FIG. 1, then in FIG. 1 this differential quotient will be:

$$\left(\frac{d\Phi_n}{ds}\right)_1 = \frac{2\Phi}{\tau_{p1}}$$

Here $\Phi$ is the numerical value of the magnetic flux associated with one permanent-magnet pole, and $[\Phi - (-\Phi)] = 2\Phi$ is the greatest change in permanent-magnet flux linking winding 5.1 during armature travel, namely during relative movement of winding 5.1 by a distance $\tau_{p1}$ from e.g. a north pole N to a south pole S.

Substituting the above into the force equation, one obtains for the force $F_1$ developed by the motor of FIG. 1:

$$F_1 = N I_{max} \frac{2\Phi}{\tau_{p1}}$$

Now, in the construction of FIG. 2 the pole pitch $\tau_{p2}$ is half that in FIG. 1: $\tau_{p2} = \tau_{p1}/2$. Accordingly, the aforementioned differential quotient here has the value $$\left(\frac{d\Phi_n}{ds}\right)_2 = \frac{\Phi/2 - (-\Phi/2)}{\tau_{p2}} = \frac{\Phi}{\tau_{p1}/2}$$

Due to the presence of two windings 5.2, 6.2, the total force $F_2$ developed by the motor of FIG. 2 will be:

$$F_2 = \frac{N}{2} I_{max} \frac{2\Phi}{\tau_{p1}} + \frac{N}{2} I_{max} \frac{2\Phi}{\tau_{p1}} = F_1$$

Thus, halving the FIG. 1 pole pitch for the FIG. 2 construction produces no increase at all in developed force.

This situation changes in the construction of FIG. 3. Here, the stack 1.3 of iron laminations is of the same total length as those in FIGS. 1 and 2 but is provided with a series of narrow pole teeth 9. In this embodiment only a single coil 5.3 is used to form the winding system. The four pole teeth to the left of winding 5.3 are spaced by $\tau_{p3}=180°$-el. one from the next, so that when one of these four pole teeth 9 registers with, e.g., a north pole portion of the permanent magnet row 3.3, 4.3, the other three will likewise be in register with north pole portions; the four pole teeth 9 to the right of winding 5.3, in contrast, will then be in register with four south pole portions. In this exemplary embodiment the length of each pole tooth 9 is equal to the pole pitch $\tau_{p3}$. When the four left pole teeth 9 register with four north pole magnet portions, the flux linking winding 5.3 is directed to the right and is at a maximum value. After relative movement by a distance $\tau_{p3}$, the four left pole teeth 9 register with four south pole magnet portions, the flux linking winding 5.3 is directed to the left and is now again at a maximum value. Accordingly, for FIG. 3, the above differential quotient is $$\left(\frac{d\Phi_n}{ds}\right)_3 = \frac{(\Phi/\tau_{p1})\tau_{p3}z - (-\Phi/\tau_{p1})\tau_{p3}z}{\tau_{p3}} = \frac{2\Phi z}{\tau_{p1}}$$

Here $(\Phi/\tau_{p1})\tau_{p3}$ is the magnetic flux provided by one permanent magnet pole portion, and $z=\tau_{p1}/2\tau_{p3}$ is the number of pole teeth 9 carrying permanent-magnet flux. In FIG. 3, it is being assumed for simplicity that the permanent-magnet flux passes through air only within the narrow gap formed below the bottom face of each of the pole teeth 9.

Thus, the developed force $F_3$ for the FIG. 3 motor can be given by:

$$F_3 = N I_{max} \frac{2 \Phi \tau_{p1}}{\tau_{p1} 2\tau_{p3}} = N I_{max} \frac{\Phi}{\tau_{p3}} = F_1 \frac{\tau_{p1}}{2\tau_{p3}}$$

From this equation it can be seen that the force $F_3$ developed by the FIG. 3 motor will be greater than the force $F_1$ developed by the FIG. 1 motor, by a factor related to the ratio of pole pitches of the two motors. The smaller the pole pitch $\tau_{p3}$ is chosen (with a corresponding increase in the number of teeth 9), the greater becomes the factor by which $F_3$ exceeds $F_1$. If $\tau_{p3}=\tau_{p1}/2$, then $F_3=F_1$ and no force increase is achieved; accordingly, the cases of interest are those wherein $\tau_{p3}<\tau_{p1}/2$. Assuming that the largest possible value of force $F_3$ is desired, then the smallest practicable value of $\tau_{p3}$ ought to be chosen.

It will be appreciated that the thickness of the air gap below the bottom face of each pole tooth 9 will in general be small in comparison to the length, measured in the armature travel direction, of a pole tooth 9, i.e., in order to avoid stray flux problems; thus, conversely, the length of the pole tooth 9 must be large compared to the air gap thickness. In effect, therefore, the smallest achievable air gap thickness tends to place a limit upon how small the pole pitch $\tau_{p3}$ in FIG. 3 can be. In manufacturing technology, air gap thicknesses as small as 0.1 mm can be practically realized. Accordingly, if maximum force is sought, the best (smallest) pole pitch and pole tooth length that can be attained will be about one order of magnitude (i.e., ten times) greater, namely about 1 mm. It will be appreciated that with so small a pole pitch the teeth in FIG. 3 will be likewise about 1 mm each in length and correspondingly numerous, imparting a quite comb-like shape to the iron body 1.3. If the pole pitch and pole tooth length are made not so small, less of a force increase is achieved. If the pole pitch and pole tooth length are made larger than about 10 mm, the character of the inventive concept becomes much less apparent, although the lesser increase in developed force may be of interest in certain particular applications.

Figure 4:
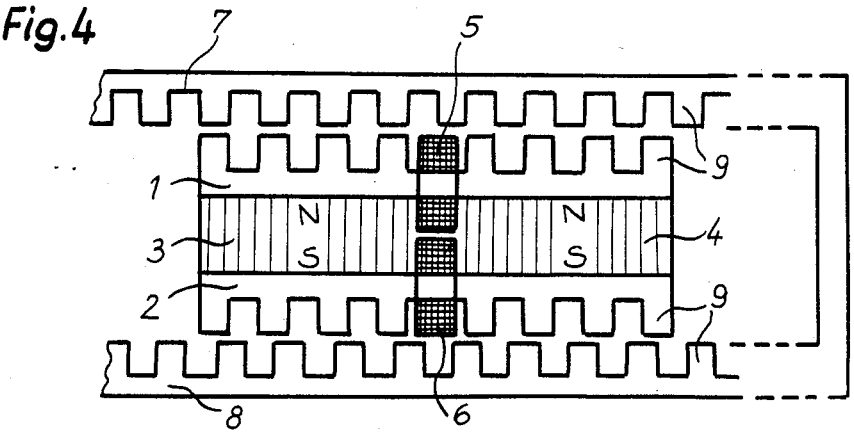
FIG. 4 depicts a preferred form of the motor of the invention.

FIG. 4 depicts a special geometry embodying the inventive concepts. Here, two stacks 1 and 2 of iron laminations with respective windings 5 and 6 are provided. The stacks 1 and 2 are both provided with pole teeth 9. The unwound motor part comprises a yoke or flux-return structure made up of two toothed parts 7 and 8 and, at the right, a connecting part. The teeth 9 of the upper yoke part 7 are spatially offset from those of the lower yoke part 8 by 90°-el. The left four teeth 9 of the upper stack 1 are shown, at the particular moment illustrated, in register with the teeth 9 of the upper yoke part 7, whereas the right four teeth 9 of stack 1 are displaced therefrom by an odd multiple of 180°-el. The left four teeth of stack 1 are in register with the left four teeth of stack 2, and the right four teeth of stack 1 are in register with the right four teeth of stack 2. The (non-illustrated) commutation circuit for the windings 5 and 6 establishes current flow through winding 5 in a first direction for 180°-el. of armature travel and in the opposite second direction for the subsequent 180°-el., etc.; the current in winding 6 is likewise reversed every 180°-el., but the current-reversal positions for winding 6 are phase-shifted by 90°-el. compared to those for winding 5. In this way, the electromagnetic force developed by the motor will be non-zero for all possible armature positions.

In FIG. 4, to reduce the volume of permanent-magnet material required, the permanent magnets 3 and 4 are provided as part of the wound part of the motor, whether/armature or stator. Thus the yoke parts 7 and 8 may be made simply of soft-magnetic material, and for the permanent magnets use can be made of two simple magnets each having one north and one south pole portion.

In the illustrated position of the FIG. 4 motor, the flux from the north pole of magnet 3 passes through the left four teeth of stack 1, then crosses to the registering four teeth of the yoke part 7, passing thereto only via the thin air gap formed between the upper faces and bottom faces of these four pairs of teeth; from there, this flux passes rightwardly along the yoke part 7, then downwardly through the right-hand connector piece, then leftwardly through the lower yoke part 8, then through teeth 9 of the bottom stack 2, back to the south pole of magnet 3. In contrast, the flux from the north pole of magnet 4 passes leftward through winding 5, then from the left four teeth 9 of stack 1 to the registering four teeth of yoke part 7, through the right-hand connector piece and the yoke part 8, and back to the south pole of magnet 4. If the armature is shifted by the length of one pole tooth, so that now the right four teeth 9 of stack 1 register with four teeth of yoke part 7, then it will be the flux from the north pole of the left-hand magnet 3 which passes through winding 5, but now in a rightward direction. The sequence at the lower half of FIG. 4 is the same as at the upper half, but is phase-shifted relative to the latter.

As already noted, the FIG. 4 construction has the advantage that large-surface single-pole-pair permanent magnets 3, 4 can be provided between the two toothed stacks 1 and 2 of iron laminations. However, as the magnetic flux from the magnets is constrained to cross the upper and lower horizontally extending air gaps through relatively narrow pole teeth 9, high values of air gap induction are obtained; this of course is of great importance for the development of high values of force. Air gap induction values of about 1 T can for example already be achieved using economical barium ferrite permanent magnets.

Figure 6:
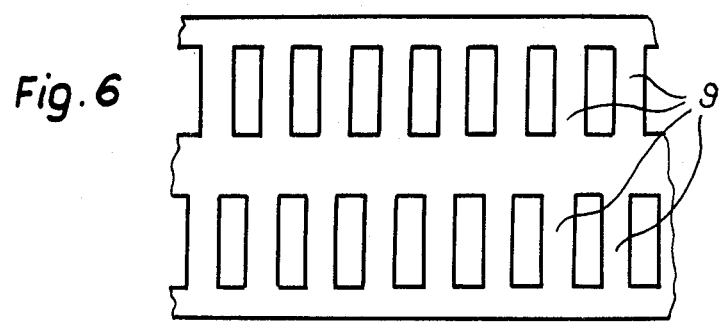
FIG. 6 depicts a modification of the motor of FIG. 5.

FIG. 5 depicts in perspective an inventive DC linear motor which differs from that of FIG. 4 only with regard to structural arrangement. The motor is so configured as to have only a single planar air gap, so that the structure corresponding to the yoke parts 7, 8 of FIG. 4 can be located in a single plane. For this reason, the yoke structure, as shown in FIG. 6, can if desired be realized by means of a sheet-metal strip provided with two rows of e.g. stamped-out rectangular cut-outs, the two rows being offset one from the next by one fourth the distance from one cut-out to the next. The webs remaining between successive cut-outs then form the pole teeth 9.

Figure 7:
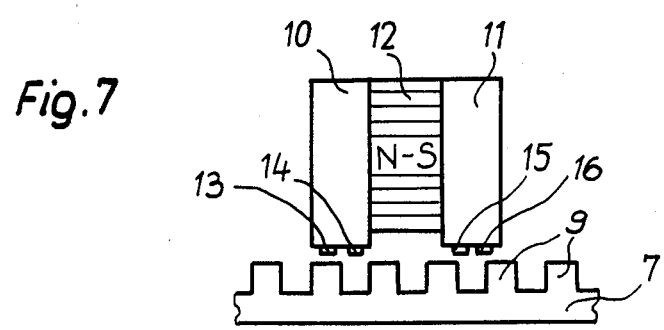
FIG. 7 depicts an armature position sensor which can be used with motors according to the invention.

FIG. 7 depicts an exemplary proposal for the armature position detector used to control the commutation circuit of such a brushless DC linear motor. The detector includes a permanent magnet 12 magnetized in horizontal direction and cooperating via soft-magnetic pole shoes 10 and 11 with the pole teeth 9 of the unwound motor part. As the magnet system 10, 11, 12 together with the four field plates 13, 14, 15, 16 is rigidly connected with the wound motor part, the varying resistance values of the field plates provide the requisite information concerning the relative positions of armature and stator.

The field plates of each field plate pair 13, 14 and 15, 16 are spatially offset from each other by a distance equal to the length of a pole tooth, measured in the armature travel direction; the two elements 13 and 14, or 15 and 16, of such a pair are connected together in series across a DC voltage source. The purpose of such series connection is to compensate as much as possible for the temperature dependence of such elements. One pair of elements 13, 14 serves to control the switching of current in one winding 5 or 6, and the other elements 15, 16 control the switching of current in the other winding. Further details of an exemplary commutation circuit may be had from my article in the West German periodical "VDI-Berichte", Nr. 482, 1983, pp. 43-47, the *entire* disclosure of which is incorporated herein by reference. It will be understood, however, that a variety of types of position sensors and commutation circuits are well known for both rotary and linear brushless DC motors, and these may be employed as desired.

The position detector of FIG. 7 may be used not only to control a commutation circuit, but also may be used in cooperation with an electronic counter to signal the actual position of the motor's armature when the motor is to be used in an open- or closed-loop positioning system.

Additionally, the illustrated DC linear motor can, like other brushless DC motors, be operated in stepmotor fashion, if the commutation circuit is controlled not by the position detector but by an adjustable-frequency pulse generator. Such a step motor would have the advantage, compared to conventional linear step motors, that high forces can be exerted by the motor even when barium ferrite is used as its permanent-magnet material.

In general, the stator of the motor can be its unwound part or its wound part, depending upon the intended application. The wound part will be chosen as the stator, for example, when the use of a flexible cable connected to a wound armature must be avoided, and likewise when there is available for the armature a volume of space which includes twice the motor's stroke length. If the wound motor part is employed as the armature, then the motor need be only slightly longer than the motor's stroke length.

In the foregoing, the inventive concepts have been illustrated with respect to brushless DC linear motors. It will be understood, however, that such concepts may for some applications likewise be of interest and be applicable in the case of analogously designed brushless DC rotary motors.

The illustrated geometries of FIGS. 3-5 are merely exemplary, and these can be extensively rearranged and modified in many different respects. Thus, and merely by way of example, it may be noted that in, e.g., FIG. 3, if one of the left teeth 9 and one of the right teeth 9 were omitted, the force developed would be decreased by 25% but still be greater than that of the motors of FIGS. 1 and 2. Likewise, in FIG. 3, the four teeth of each tooth group are spaced one from the next by a distance equal to the spacing between two like-polarity poles of the magnet row. However, if the tooth spacing were for example doubled, the resulting force developed would remain unchanged, although of course the total length of the stack 1.3 would then be larger. Also, if in FIG. 3 there were provided not two groups of four pole teeth each, but instead of e.g. five or six pole teeth each, the developed force would be further increased, although again at the price of an increased length for the stack 1.3. These are but examples of the modifications and rearrangements that can be resorted to without departing from the inventive concepts.

It will be understood that each of the elements described above, or two or more together, may also find a useful application in other types of electrical machines differing from those shown and described.

While the invention has been illustrated and described as embodied in a brushless DC linear or rotary machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A linear motor, comprising
an elongated unwound structural unit of magnetically conductive material, and
a wound structural unit,
one of said structural units being a stator and the other being an armature that can travel relative to the stator in a travel direction that is the same as the direction of elongation of said elongated unwound structural unit, the wound structural unit comprising permanent-magnet means polarized in direction transverse to the armature travel direction, and the wound structural unit furthermore comprising first and second flux-conducting means made of magnetically conductive material spaced from each other in direction transverse to the armature travel direction, said permanent-magnet means being sandwiched between said first and second flux-conducting means for transmission of the flux of said permanent-magnet means through said first and second flux-conducting means, said first and second flux-conducting means being each formed with respective tooth-groups that are located one after the next in said armature travel direction, with each tooth-group comprising a series of tooth portions that are spaced one from the next in the armature travel direction, said unwound structural unit being formed with a first series of tooth portions spaced one from the next in said armature travel direction and a second series of tooth portions spaced one from the next in said armature travel direction, the first series of tooth portions being spaced from the second series of tooth portions in direction transverse to the armature travel direction, the wound structural unit being so located relative to the unwound structural unit that the tooth-groups of the first flux-conducting means form a first air gap with said first series of tooth portions, and the tooth-groups of the second flux-conducting means form a second air gap with said second series of tooth portions, whereby flux emanating from said permanent-magnet means is constrained to cross both the first and the second air gap in order to return to said permanent-magnet means, the tooth-groups of the first flux-conducting means including tooth-groups that are differently phased relative to each other, and the tooth-groups of the second flux-conducting means including tooth-groups that are differently phased relative to each other, the wound structural unit furthermore comprising first coil means wound around said first flux-conducting means but not around said second flux-conducting means, and second coil means wound around said second flux-conducting means but not around said first flux-conducting means.

2. A motor as defined in claim 1, said first and second coil means comprising coils having longitudinal axes that extend parallel to the armature travel direction.

3. A motor as defined in claim 2, the first and second flux-conducting means each having a total of two tooth-groups, the first and second coil means each consisting of a single coil located intermediate the two tooth-groups of the respective flux-conducting means.

4. A motor as defined in claim 3, the tooth portions of said first and second series of tooth portions all having end faces located in a single plane, the tooth portions of the tooth-groups of said first and second flux-conducting means all having end faces located in a single plane.

5. A motor as defined in claim 3, said permanent-magnet means comprising two permanent-magnet units of which both are polarized transverse to the armature travel direction, the two permanent-magnet units being spaced one from the other in the armature travel direction, with each permanent-magnet unit having in the armature travel direction a length substantially corresponding to the length of a tooth-group, the two permanent-magnet units being spatially separated from each other in the armature travel direction to leave therebetween a space that accommodates a portion of the first coil means and a portion of the second coil means.

6. A motor as defined in claim 5, the motor furthermore comprising position-detecting means for detecting the position of the wound and unwound structural units relative to each other and for generating signals indicative of such relative position useful for commutating the motor.

7. A motor as defined in claim 6, the position-detecting means comprising means located to sense the magnetic flux in at least one of said air gaps.

8. A motor as defined in claim 5, wherein the tooth-length of the tooth portions is about 1 mm measured in the armature travel direction.

* * * * *